(12) United States Patent
Shimizu

(10) Patent No.: US 6,664,678 B2
(45) Date of Patent: Dec. 16, 2003

(54) WIRING CONNECTION DEVICE

(75) Inventor: Michinori Shimizu, Hamamatsu (JP)

(73) Assignee: Suzuki Motor Corporation, Shizuoka-ken (JP)

( * ) Notice: Subject to any disclaimer, the term of this patent is extended or adjusted under 35 U.S.C. 154(b) by 65 days.

(21) Appl. No.: 09/966,210

(22) Filed: Sep. 27, 2001

(65) Prior Publication Data

US 2002/0043883 A1 Apr. 18, 2002

(30) Foreign Application Priority Data

Oct. 12, 2000 (JP) ........................... 2000-312033

(51) Int. Cl.[7] ................................................. H02K 5/22
(52) U.S. Cl. ........................... 310/71; 310/71; 310/89; 310/88
(58) Field of Search ..................... 310/71, 88, 89

(56) References Cited

U.S. PATENT DOCUMENTS

| | | | | |
|---|---|---|---|---|
| 4,451,750 A | * | 5/1984 | Heuer ........................ | 310/88 |
| 4,998,035 A | * | 3/1991 | Jenson ....................... | 310/91 |
| 5,408,154 A | * | 4/1995 | Meiser ....................... | 310/71 |
| 5,773,904 A | * | 6/1998 | Schiebhold ................. | 310/92 |
| 6,031,307 A | * | 2/2000 | Ohshita ..................... | 310/71 |
| 6,455,962 B2 | * | 9/2002 | Suzuki ....................... | 310/71 |

FOREIGN PATENT DOCUMENTS

| | | |
|---|---|---|
| JP | 5-72058 | 9/1993 |
| JP | 6098494 | 4/1994 |
| JP | 7222392 | 8/1995 |
| JP | 8037752 | 2/1996 |
| JP | 8214492 | 8/1996 |
| JP | 10112958 | 4/1998 |
| JP | 10340716 | 12/1998 |
| JP | 11098755 | 4/1999 |

* cited by examiner

Primary Examiner—Nestor Ramirez
Assistant Examiner—Iraj A. Mohandesi
(74) Attorney, Agent, or Firm—Flynn, Thiel, Boutell & Tanis, P.C.

(57) ABSTRACT

Objects of this invention are to reduce costs, improve ease of operation, improve the water-resistance within the terminal case, and improve reliability. To these ends, in this invention the motor stator of an electric motor is mounted in a motor case which is mounted on the cylinder block of an engine; the motor rotor of the electric motor is mounted on a rotor mounting member which is mounted on the engine crankshaft; on the outer periphery of the case periphery wall of the motor case is formed a terminal box, with vertical walls standing integrally, and having an aperture portion directed in the outward radial direction; in the case periphery wall, enclosed by the vertical walls, is formed a motor-side through hole, directed in the outward radial direction; on the motor-side coil wire is mounted a motor-side connection terminal; this motor-side connection terminal is embedded and retained in the motor-side through hole by molding, and by means of this molding the motor-side through hole is sealed.

19 Claims, 11 Drawing Sheets

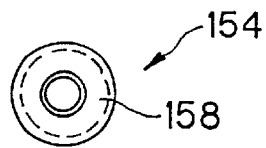
FIG. 10A
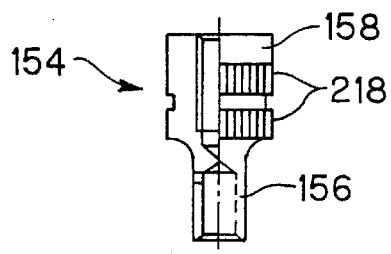
FIG. 10B
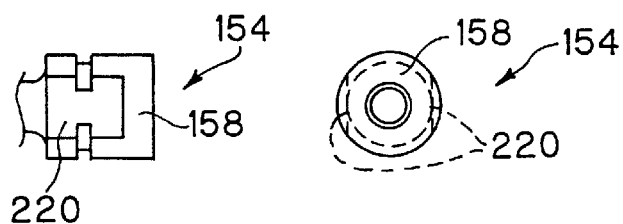
FIG. 11A
FIG. 11C  FIG. 11B
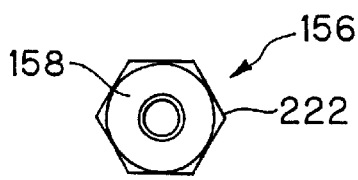
FIG. 12A
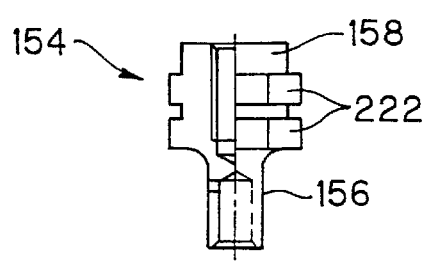
FIG. 12B

WIRING CONNECTION DEVICE

BACKGROUND OF THE INVENTION

1. Field of the Invention

This invention relates to a wiring connection device, and in particular to a wiring connection device with a simplified construction to enable cost reduction, which can facilitate connection operations and improve ease of operations, and which can improve water resistance within terminal cases and improve reliability.

2. Description of the Related Art

Among vehicles there are so-called hybrid vehicles, which are provided with a vehicle motor-assist device, provided with an electric motor driven by electrical energy and having an electricity generating function, and which is directly coupled to the engine driven by fuel combustion as the motive power source, to assist the driving force of the engine with the driving force of the motor.

The electric motor comprised by the above vehicle motor-assist device is provided with a motor stator mounted in a motor case, with a motor rotor mounted on a rotor mounting member, with a motor-side coil wire from the motor stator coil unit of the motor stator drawn into the motor case, and this motor-side coil wire connected to a power supply cable outside the motor case.

The motor-side coil wire of the electric motor and the outside power supply cable are connected by means of a wiring connection device. For example, in the device described in Japanese Patent Laid-open No. 8-214492, a junction terminal block is installed within an inner-wall frame of the motor, and by means of this junction terminal block, a power-feed cable and stator winding wire are connected. In the device described in Japanese Patent Laid-open No. 8-37752, a terminal box is mounted on the frame enclosing the stator, and a terminal block is provided thereon; by means of this terminal block, the power supply cable and stator winding wire are connected.

In the device described in Japanese Patent Laid-open No. 7-222392, crimping terminals at each cable end are mounted by bolts to both ends of a stud penetrating into and out of the shield case. The device described in Japanese Patent Laid-open No. 5-72058 provides a cover terminal, mounted on the cover of a thermal battery, for connection to an internal lead and an external circuit; a screw portion is formed on the part of the cover terminal protruding outside, a bolt is screwed onto this screw portion, and a lead wire crimping terminal is mounted.

In the device described in Japanese Patent Laid-open No. 6-98494, an adapter terminal is fitted to the inner hole of a bushing, passing through and fixed in place in a through-hole penetrating the case wall of a motor case; the case wall through-hole and bushing, and the bushing inner hole and adapter terminal are each sealed, and the adapter terminal is connected to both ends of a power supply. In the device described in Japanese Patent Laid-open No. 11-98755, the inner wall of the driving case of a driving apparatus for electric automobiles has a lead-in member, and a window-hole is provided which coordinates, in the axial direction, the connecting portions of the lead terminal in the end wall and the terminal of the power cable. In the device described in Japanese Patent Laid-open No. 10-112958, a lead wire is connected, soldered and fixed to a terminal rod on one end of a shielded power cable, and the other end of the shielded power cable is drawn outside from a through hole in the front side of an end bracket.

However, the devices described in the above Japanese Patent Laid-open No. 8-214492 and Japanese Patent Laid-open No. 8-37752 require space for installation of a terminal block, and so have the problem of increased size.

The device of the above Japanese Patent Laid-open No. 7-222393 has the problem of requiring working space in order to install bolts on both ends of the stud penetrating inside and outside of the shield case. The device of Japanese Patent Laid-open No. 5-72058 has the problems of an increased number of parts and increased cost due to the provision of a terminal unit of complex construction penetrating a flange, and also has the problem of requiring working space for soldering after mounting the terminal on the flange.

The device of the above Japanese Patent Laid-open No. 10-340716 has the problem of requiring working space in order to mount the lead wire crimping terminal onto the cover terminal using a bolt, and the installation procedure is troublesome; further, working space is required to insert the cover terminal into the cover through hole and fix it in place, and then to spot-weld the terminal portion.

The device of the above Japanese Patent Laid-open No. 6-98494 has the problem that the electric wire cable is positioned in the working range of the bolt to fix in place the bushing to the through-hole penetrating the case wall of the motor case, resulting in difficulty in tightening the bolt. The device of the above Japanese Patent Laid-open No. 11-98755 has the problem that the terminal of a lead extending in a free state from the motor core must be grasped from a small window-hole formed in the end wall, matched with the terminal of the power cable fixed to the inner wall of the driving case, and connected by means of a connecting bolt, so that the connection process is difficult. The device of the Japanese Patent Laid-open No. 10-112958 has the problem that the terminal of a lead wire extending in a free state from the stator must be grasped from a small hole formed in the front-side end bracket, matched with the terminal rod of the shielded power cable passing through and fixed in the cable through-hole of the front-side end bracket, and fixed in place using a bolt, so that the connection process is difficult.

SUMMARY OF THE INVENTION

In order to eliminate the above difficulties, this invention is characterized in that a motor case of substantially cylindrical shape is mounted on the cylinder block of an engine, and on this motor case is mounted the motor stator of an electric motor having an electricity generation function; a rotor mounting member is mounted on the crankshaft of the above engine, and on this rotor mounting member is mounted the motor rotor of the above electric motor; on the outer periphery of the case periphery wall of the above motor case is formed a terminal box, having substantially the shape of a square cylinder and with vertical walls standing integrally, and having an aperture portion directed in the outward radial direction; a motor-side through hole, directed in the outward radial direction and which penetrates into the above motor case, is formed in the case periphery wall enclosed by the above vertical walls, a motor-side connection terminal is mounted on the motor-side coil wire drawn from the above motor stator, this motor-side connection terminal is embedded and held by molding[i] within the above motor-side through hole, and by means of this molding the above motor-side through hole is sealed.

[i] This translates morudo; however, "sealer" or "sealant" might be preferable.

BRIEF DESCRIPTION OF THE DRAWINGS

FIG. 10A is a plane view of a first modified example of a motor-side connection terminal;

FIG. 10B is a half-cross-sectional view of a first modified example of a motor-side connection terminal;

FIG. 11A is a plane view of a second modified example of a motor-side connection terminal;

FIG. 11B is a half-cross-sectional view of a second modified example of a motor-side connection terminal;

FIG. 11C is a side view with portions omitted of a second modified example of a motor-side connection terminal;

FIG. 12A is a plane view of a third modified example of a motor-side connection terminal;

FIG. 12B is a half-cross-sectional view of a third modified example of a motor-side connection terminal;

DESCRIPTION OF THE PREFERRED EMBODIMENTS

Figure 1:
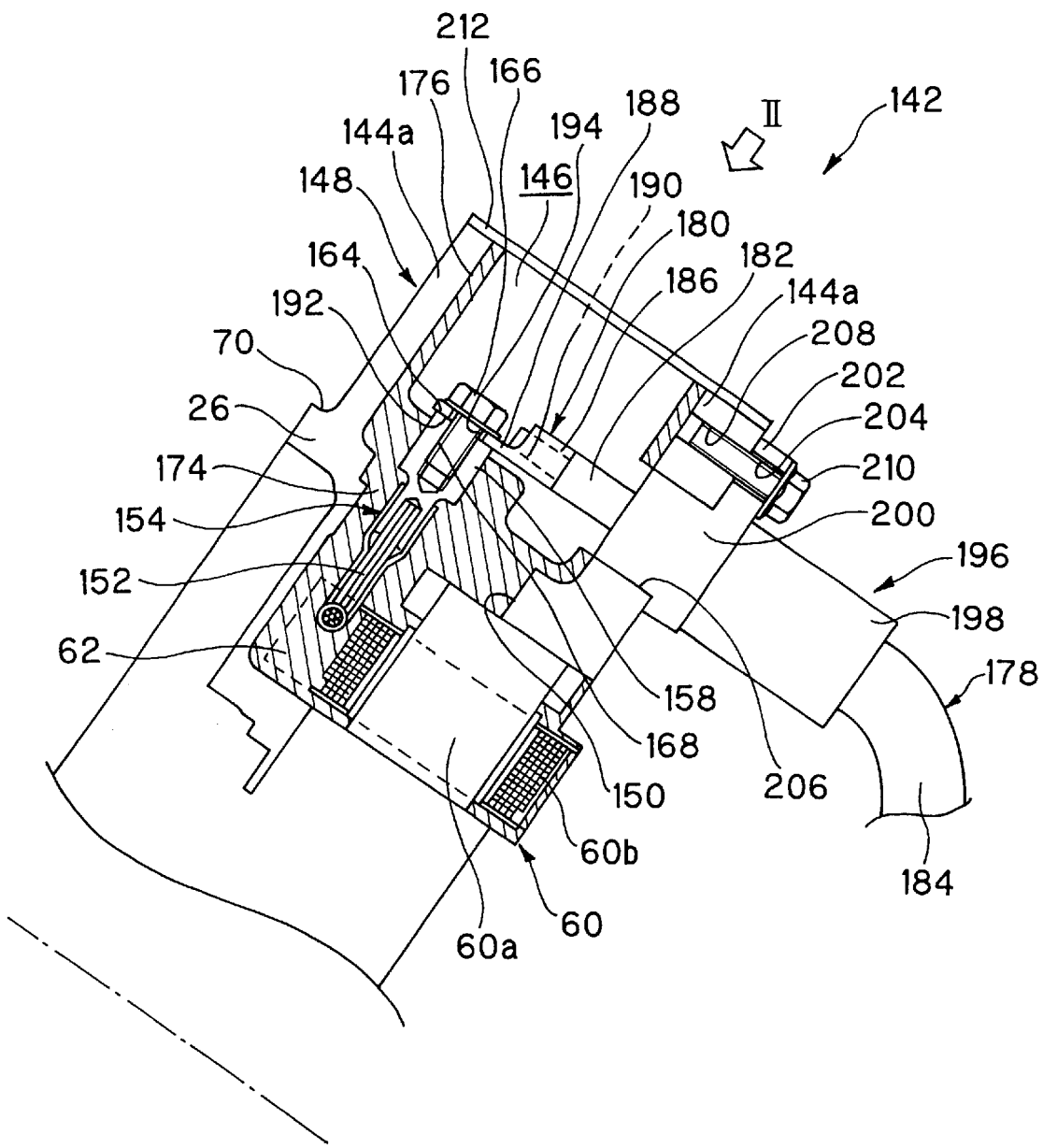
FIG. 1 is an enlarged cross-sectional view taken along line I—I of FIG. 7, showing an embodiment of a wiring connection device.

In the wiring connection device of this invention, by forming on the outer periphery of the case periphery wall of a motor case of substantially cylindrical shape a terminal box of substantially square-cylindrical shape, with vertical walls standing integrally, and having an aperture portion directed in the outward radial direction, forming a motor-side through hole, directed in the outward radial direction and which penetrates into the above motor case, in the case periphery wall enclosed by the above vertical walls, mounting a motor-side connection terminal on motor-side coil wire drawn out from the motor stator, and embedding and holding this motor-side connection terminal in the motor-side through hole by means of molding, while also sealing the motor-side through hole using this molding, a separate terminal block or terminal case is not required, wire-connection operations within the motor case become unnecessary, and the terminal box interior and motor case interior can be isolated to a watertight degree.

Below, embodiments of this invention are explained, based on the drawings. FIG. 1 through FIG. 9 show an embodiment of this invention. In FIG. 9, 2 is the engine mounted in the vehicle (not shown), 4 is a vehicle motor-assist device, and 6 is the transmission. This engine 2 is driven by fuel combustion, and is linked to the transmission 6 via the vehicle motor-assist device 4.

The engine 2 has a cylinder block 8, cylinder head 10, head cover 12, lower case 14, and oil pan 16; in the lower part of the cylinder block 8, the crankshaft 18 is axially supported by the lower case 14.

The above vehicle motor-assist device 4 is provided on the output side of the crankshaft 18 of the engine 2. In the vehicle motor-assist device 4, a substantially cylindrical motor case 20 is mounted on the cylinder block 8 on the output-side end of the crankshaft 18, and a rotor mounting member 22 is mounted on the output-side end of the crankshaft 18.

Figure 7:
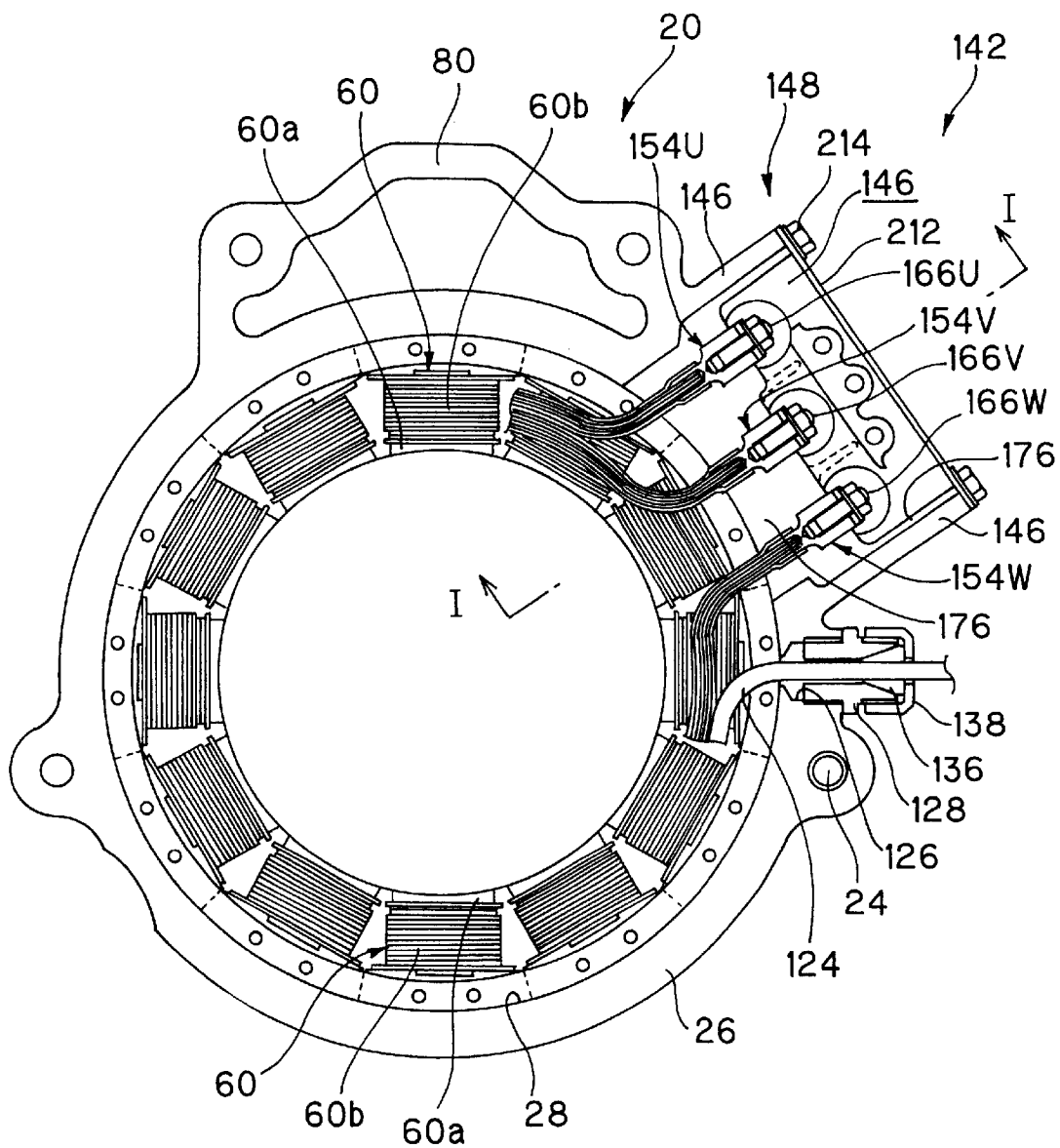
FIG. 7 is a cross-sectional view taken along line VII—VII of FIG. 8.
Figure 8:
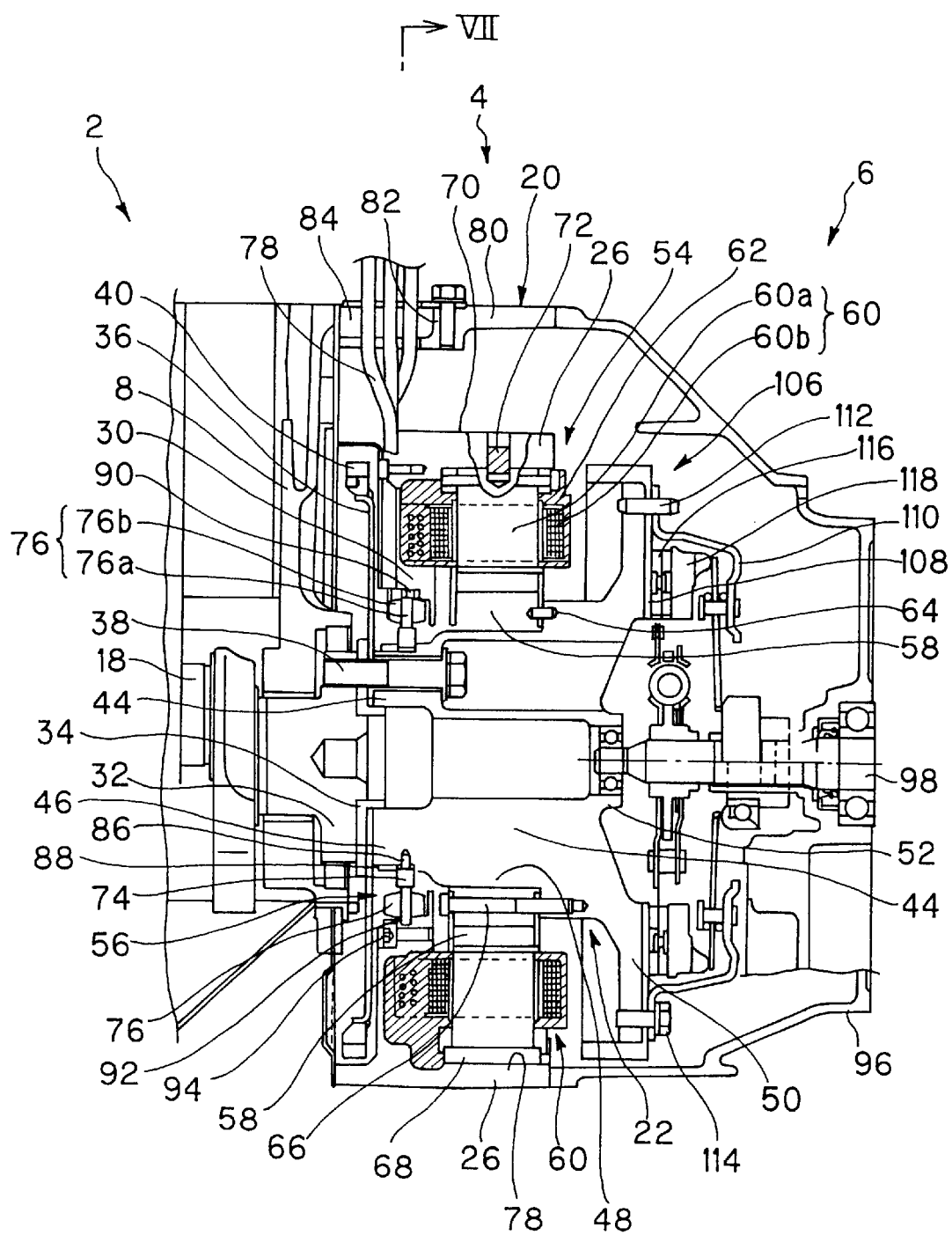
FIG. 8 is a cross-sectional view of a vehicle motor-assist device.
Figure 9:
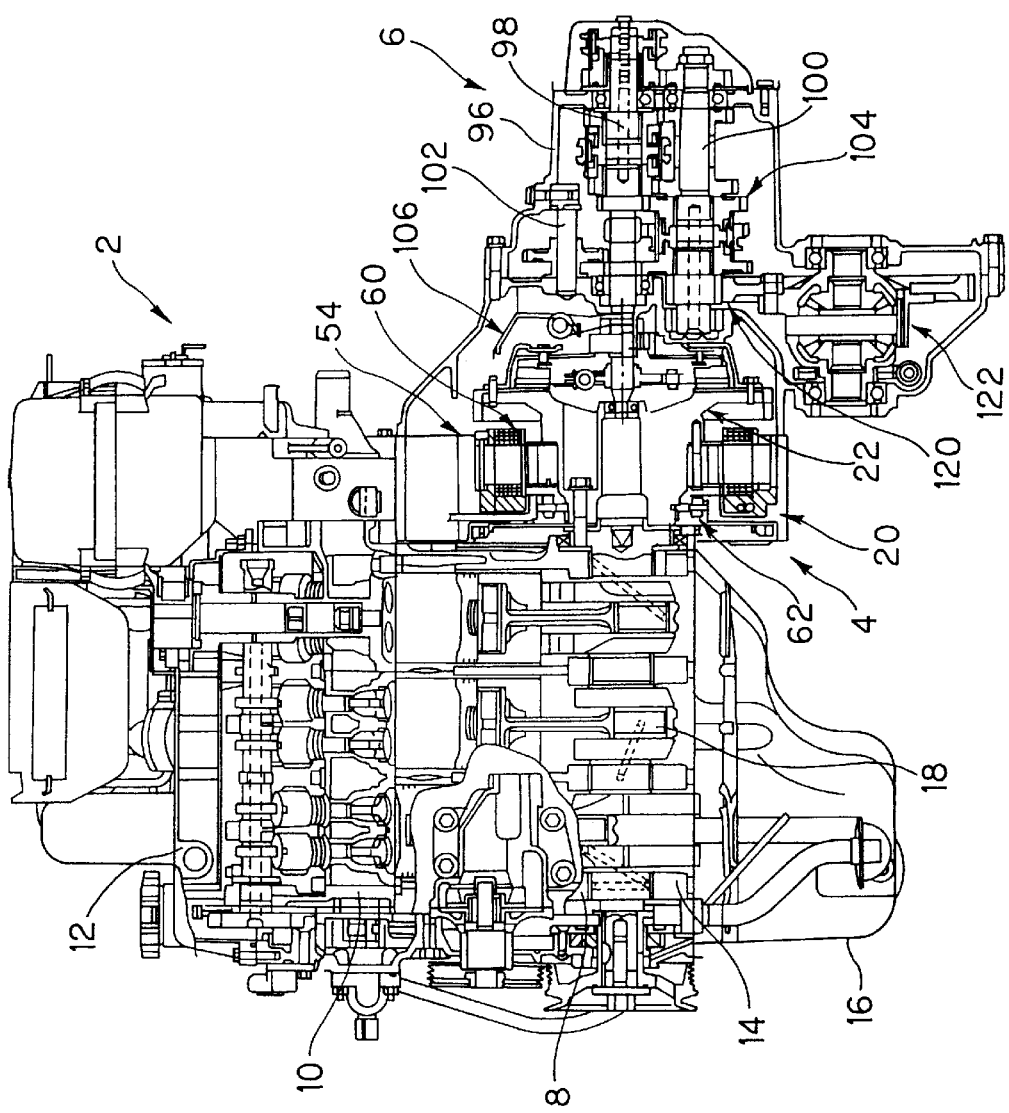
FIG. 9 is a cross-sectional view of an engine provided with a vehicle motor-assist device.

As shown in FIG. 7 and FIG. 8, the above motor case 20 is mounted on the cylinder block 8 together with a transmission case 96, described below, by means of a mounting bolts 24. In the motor case 20, a motor stator mounting portion 28 is provided on the side of the transmission 6 within the cylindrical-shaped case periphery wall 26, and a ring-shape sensor stator mounting portion 30 is provided on the side of the engine 2 within the case periphery wall 26.

The above rotor mounting member 22 is mounted and fastened to the crankshaft mounting portion 32 on the output side of the crankshaft 18, together with the flange member 34 and drive plate 36, by means of a mounting bolt 38. The drive plate 36 is provided with a starter-driven gear 40 on its outer periphery edge. The starter driven gear 40 meshes with the starter drive gear of the starter motor, not shown.

The rotor mounting member 22 is provided with a cylinder portion 42 extending from the engine 2 toward the transmission 6, and a motor-side mounting portion 44 is provided mounted on the above crankshaft-side mounting portion 42 on the end of the cylinder portion 42 on the side of the engine 2. A sensor rotor mounting portion 46 is provided on this motor-side mounting portion 44 in the outer-edge periphery direction on the side of the engine 2, and a motor rotor mounting portion 48 is provided at the midpoint position of the cylinder portion 42, in the outer peripheral direction. A flat ring-shape flywheel 50 is provided on the outer periphery on the side of the transmission 6 of the cylinder portion 42, and a shaft strut 52 for the input shaft 98, described below, is provided on the inner periphery on the side of the transmission 6 of the cylinder portion 42.

The vehicle motor-assist device 4 is provided with the electric motor 54, driven by electric energy and having an electricity generation function, directly coupled to the output-side end of the crankshaft 18, and with a rotation position sensor 56, which detects the rotation position of the electric motor 54, provided.

The above electric motor 54 comprises a motor rotor 58 and a motor stator 60 positioned in correspondence with this motor rotor 58. The motor stator 60 has a motor stator core portion 60a and a motor stator coil portion 60b. The motor stator coil portion 60b is sealed and shaped with molding 62, in order to improve watertightness, electrical insulation, and cooling properties.

The above motor rotor 58 is positioned at the motor rotor mounting portion 48 of the rotor mounting member 22 by a knock pin 64, and mounted by a mounting bolt 66. In the above motor stator 60, the motor stator core portion 60a is joined to the motor stator mounting portion 28 of the motor case 20 from the side of the transmission 6, positioned by a key 68 and shrink-fit, and mounted by a knock pin 72 penetrating from the outer periphery 70 of the case periphery wall 26.

The above rotation position sensor 56 comprises a sensor rotor 74 and a sensor stator 76 positioned in correspondence with this sensor rotor 74, in order to detect the rotation position of the motor rotor 58 relative to the motor stator 60. The sensor stator 76 has a sensor stator core portion 76a and a sensor stator coil portion 76b. The sensor stator coil portion 76b is potted with silicon resin or similar in order to ensure watertightness and electrical insulation.

A signal wire 78 is drawn out from the sensor stator coil portion 76b. The signal wire 78 is retained by a retention member 84 linked with the linking hole 82 in the external wall 80, provided integrally and substantially parallel with the outer periphery 70 of the case periphery wall 26, and is guided outside the motor case 20 and connected to control means, not shown.

The above sensor rotor 74 is positioned at the sensor rotor mounting portion 46 of the rotor mounting member 22 by the knock pin 86, and is mounted by a bushing 88 as a mounting fixture. In the above sensor stator 76, the sensor stator core portion 76a is linked to the sensor stator mounting portion 30 of the motor case 20 from the side of the engine 2, is positioned by a knock pin 90, and is mounted by the mounting bolt 94 via the clamp 92.

In the vehicle motor-assist device 4, the transmission 6 is provided coupled on the side of the flywheel 50. In the transmission 6, the transmission case is, together with the motor case 20, fixed and mounted on the cylinder block 8 of the engine 2 by a mounting bolt 24.

As shown in FIG. 9, in the above transmission 6, the shaft strut 52 of the rotor mounting member 22 and the transmission case 96 support the input shaft 98, and an output shaft 100 is provided in the transmission case 96, parallel with this input shaft 98. A reverse idler shaft 102 is supported and provided in the transmission case, parallel to the input shaft 98 and output shaft 100. The transmission 6 is provided with a transmission gear train 104 for forward and backward states, between the input shaft 98, output shaft 100, and reverse idler shaft 102.

In the transmission 6, a clutch 106 is provided between a side end of the vehicle motor-assist device 4 at the input shaft 98 and the flywheel 50 of the rotor mounting member 22. In the clutch 106 is, as shown in FIG. 8, a flywheel plate 108 and clutch cover 110 are positioned at the flywheel 50 by a knock pin 112, and mounted and fastened by the mounting bolt 114.

In the clutch 106, a clutch disc 116 provided at the input shaft 98 so as to be movable in the axial direction but non-rotatable is pressed against and released from the flywheel plate 108 by a pressure plate 118, to transmit or cease transmission of the driving force of the engine 2 and electric motor 54 to the input shaft 98 of the transmission 6.

The transmission 6 converts the rotation speed and torque of the driving force input via the clutch 106 by means of a transmission gear train 104, transmits the driving force by means of a stopping/slowing gear train 120 to the differential 122 supported by a transmission case 96, and transmits the driving force to the right and left driving wheels, not shown.

Figure 6:
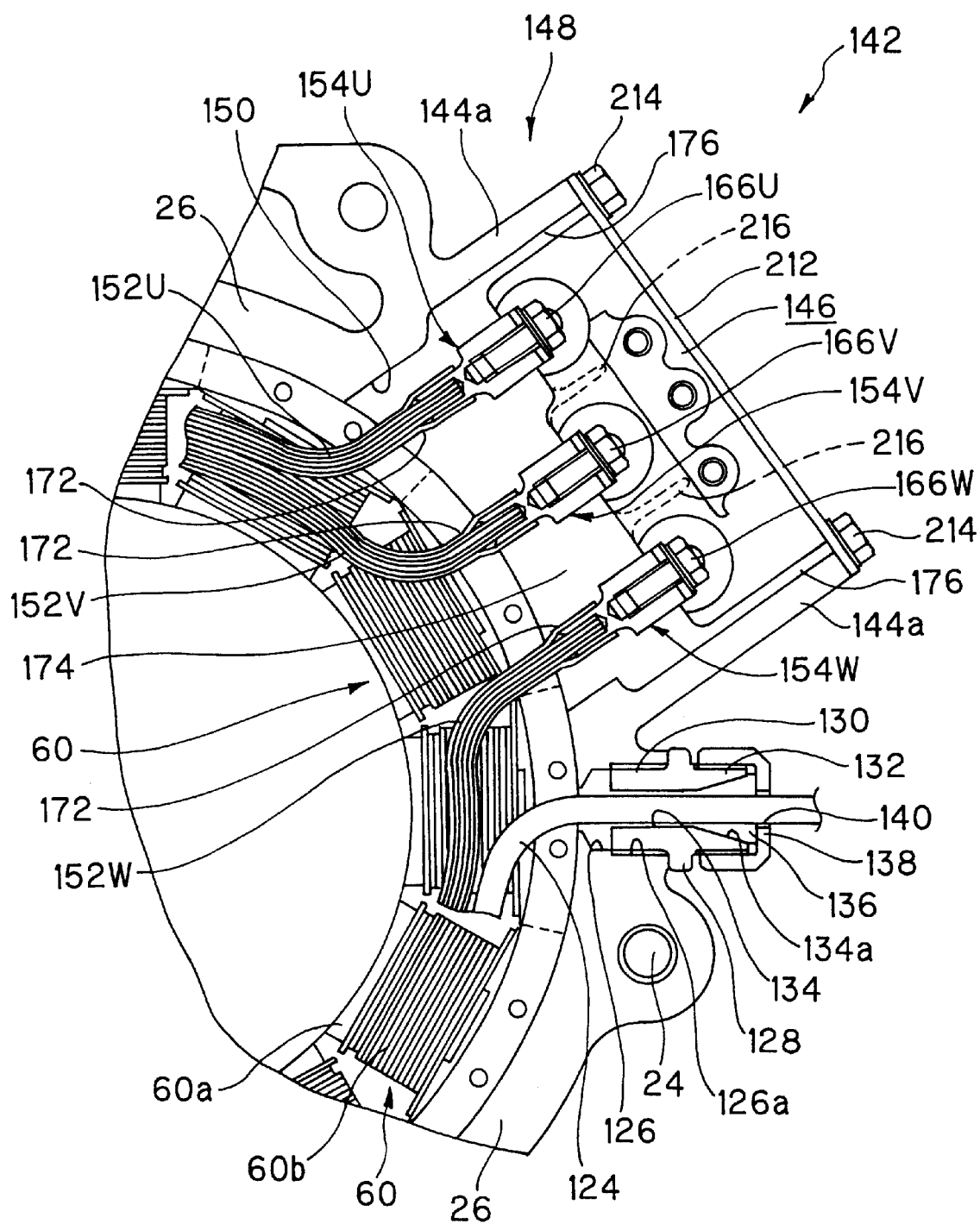
FIG. 6 is an enlarged view of principal parts of the motor case shown in FIG. 7.

As shown in FIG. 6, in the vehicle motor-assist device 4, a sensor cable 124 is drawn out from a temperature sensor, not shown, installed in the motor stator coil portion 60b of the motor stator 60. In the motor case 20 a drawing-out hole 126 is formed which penetrates the case periphery wall 26, and a mounting screw portion 130 of one end of a cable drawing-out fixture 128 is screwed into the mounting hole 126a of the drawing-out hole 126. A lid screw portion 132 is provided on the other end of the cable drawing-out fixture 128, and a retaining hole 134 which penetrates from one end to the other end is provided; a bushing mounting hole 134a is provided at the other end of the retaining hole 134, which is opened in a taper shape.

The sensor cable 124 passes from the drawing-out hole 126 in the case periphery wall 26 to the retaining hole 134 in the cable drawing-out fixture 128, is retained in watertight fashion to the bushing mounting hole 134a by the mounting bushing 136, is guided through the through-hole 140 of the lid 138 screwed to the lid screw portion 132 and outside the motor case 20, and connected to control means, not shown.

As shown in FIG. 1 through FIG. 3 and FIG. 6, in the vehicle motor-assist device 4, as the wiring connection device 142, on the outer periphery 70 of the case periphery wall 26 of the motor case 20 a terminal box 148 is formed, having substantially the shape of a square cylinder with vertical walls 144 standing integrally, and having an aperture portion 146 directed in the outward radial direction of the substantially-cylindrical motor case 20. In the terminal box 148 is formed, in the case periphery wall 26 surrounded by the vertical walls 144, a motor-side through hole 150 penetrating into the motor case 20, directed in the outward radial direction of the motor case 20.

In the electric motor 54, a plurality of motor-side coil wires 152 is drawn out from the motor stator coil portion 60a of the motor stator 60. The motor-side coil wires 152 are bundled by respective phases, including U-phase motor coil wires 152U, V-phase motor coil wires 152V, and W-phase motor coil wires 152W.

Figure 4A:
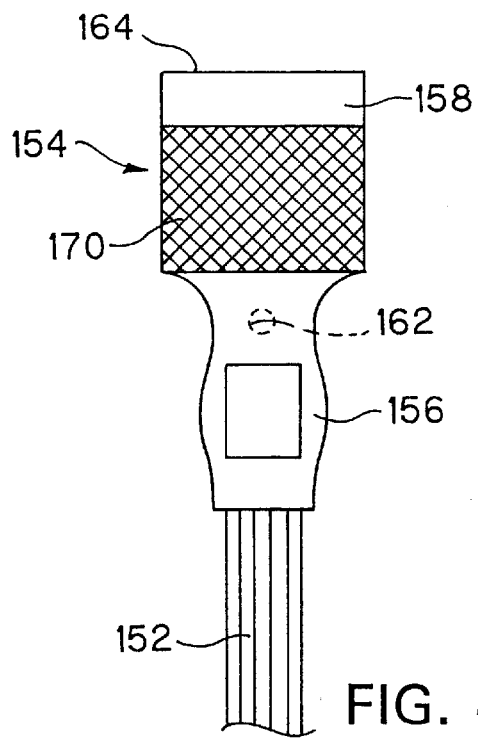
FIG. 4A is a front view of the motor-side connection terminal mounted on the motor-side coil wire.
Figure 4B:
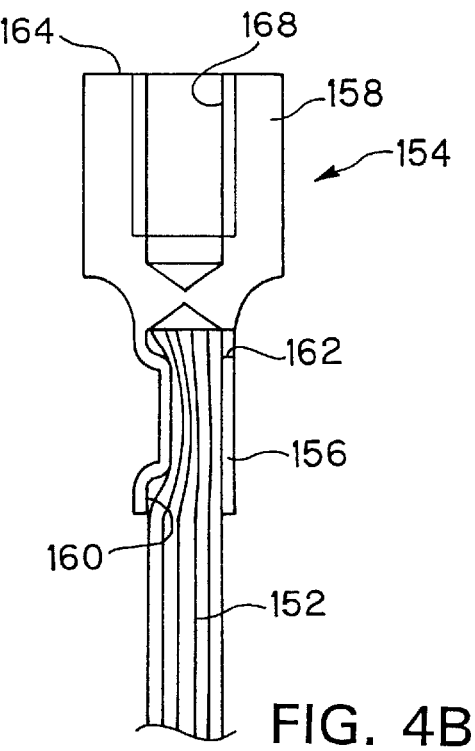
FIG. 4B is a cross-sectional view of the motor-side connection terminal.
Figure 4C:
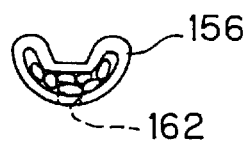
FIG. 4C is a bottom view of the motor-side connection terminal.
Figure 5A:
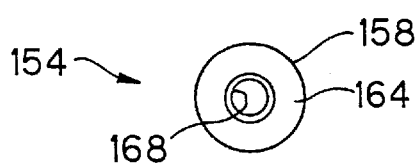
FIG. 5A is a plane view of the motor-side connection terminal.
Figure 5B:
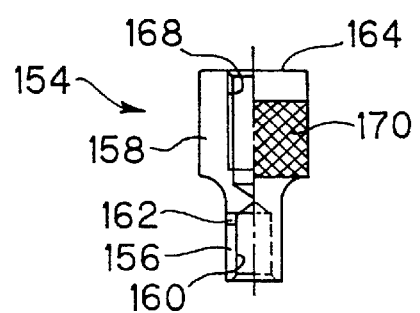
FIG. 5B is a half-cross-sectional view of the motor-side connection terminal.

Motor-side connection terminals 154U, 154V, 154W are mounted onto the respective plurality of drawn-out motor-side coil wires 152W, 152V, 152W. Each motor-side connection terminal 154 comprises a base-side small-diameter coil wire retaining portion 156 and tip-side large-diameter motor-side connection portion 158, as shown in FIG. 4 and FIG. 5.

In the above coil wire retaining portion 156, a motor wire insertion hole 160 into which the motor-side coil wire 152 is inserted is formed, directed in the axial direction. In one side in the radial direction, adjacent to the motor-side connection portion 158, is formed a plating liquid hole 162, into which plating liquid is poured into the coil wire insertion hole 160.

In the above motor-side connection portion 158 is formed a motor-side connection surface 164 orthogonal with the axial direction at the tip; a connection screw hole 168, into which a connection bolt 166 is screwed, is formed from the motor-side connection surface 164 directed in the axial direction, and on the outer periphery a whirl-stop portion 170 is formed, buried in molding 174, described below. In this embodiment, the whirl-stop portion 170 is formed with a diagonal-line knurled surface.

The motor-side connection terminals 154 are plated in order to improve rust resistance and contact electrical resistance. In the motor-side connection terminals 154, the motor-side coil wire 152 is inserted into the coil wire insertion hole 160 of the coil wire retaining portion 156 after plating, the coil wire retaining portion 156 is crimped with an appropriate tool from the other side in the radial direction opposing the plating liquid hole 162, and the motor-side coil wire 152 is crimped and mounted on the coil wire retaining portion 156.

As shown in FIG. 6, in the motor-side connection terminals 154, the coil wire retaining portion 156 is enveloped by, for example, a silicone varnished glass woven tube or other insulating tube 172, to improve electrical insulation. This insulating tube 172 also covers the motor-side coil wire 152.

The plurality of motor-side connection terminals 154U, 154V, 154W, in which a plurality of motor-side coil wires 152U, 152V, 152W are crimped and mounted in coil wire retaining portions 156, are embedded and retained within the motor-side through hole 150 formed in the case periphery wall 26 surrounded by the vertical walls 144 of the terminal box 148, by means of molding 174 directed outward in the radial direction of the motor case 20 and parallel to the peripheral direction, and in addition, the motor-side through hole 150 is sealed by means of this molding 174. The inner surfaces of the vertical walls 146 of the terminal box 148 are covered with molding 176.

The molding 62 which seals the above motor stator coil portion 60b, and the molding 174 which embeds and retains the above motor-side connection terminals 154, are formed simultaneously. In this embodiment, the molding 176 which covers the inner surfaces of the vertical walls 144 of the terminal box 148 is formed simultaneously with the above molding 62 and 174.

A plurality of power supply cables 178U, 178V, 178W is electrically connected to the above respective plurality of motor-side coil wires 152U, 152V, 152W. The respective cable-side connection terminals 180U, 180V, 180W are mounted on the plurality of power supply cables 178U, 178V, 178W.

In each of the above power supply cables 178, a core 182 is covered by a shield 184 as shown in FIG. 1, and is connected to an inverter, not shown. Each of the above cable-side connection terminals 180 comprises a base-side cylindrical-shape cable retaining portion 186, and a tip-side plate-shape cable-side connecting portion 188.

A motor wire insertion hole 190, into which is inserted and crimped the core 182 of a power supply cable 178, is formed in the above cable retaining portion 186, directed in the axial direction. The above cable-side connecting portion 188 extends from one side in the radial direction of the cable retaining portion 186 into a plate shape in the axial direction, and a cable-side connecting surface 192 in contact with the motor-side connecting surface 164 of the above motor-side connection terminals 154 is formed on one face; a connection through hole 194, into which is inserted the above connection bolt 166, is formed in a direction intersecting the axis.

On the plurality of power supply cables 178U, 178V, 178W are mounted the above cable-side connection terminals 180U, 180V, 180W, and are mounted the connectors 196U, 196V, 196W, fixed to the vertical walls 144 of the terminal box 148.

Each connector 196U, 196V, 196W has a connector body 198U, 198V, 198W which is electrically connected to the shield 184U, 184V, 184W of the power supply cable 178U, 178V, 178W; a connector-side mating portion 200U, 200V, 200W; a connector-side fastening portion 202U, 202V, 202W; and a through hole for fastening 204U, 204V, 204W.

Figure 2:
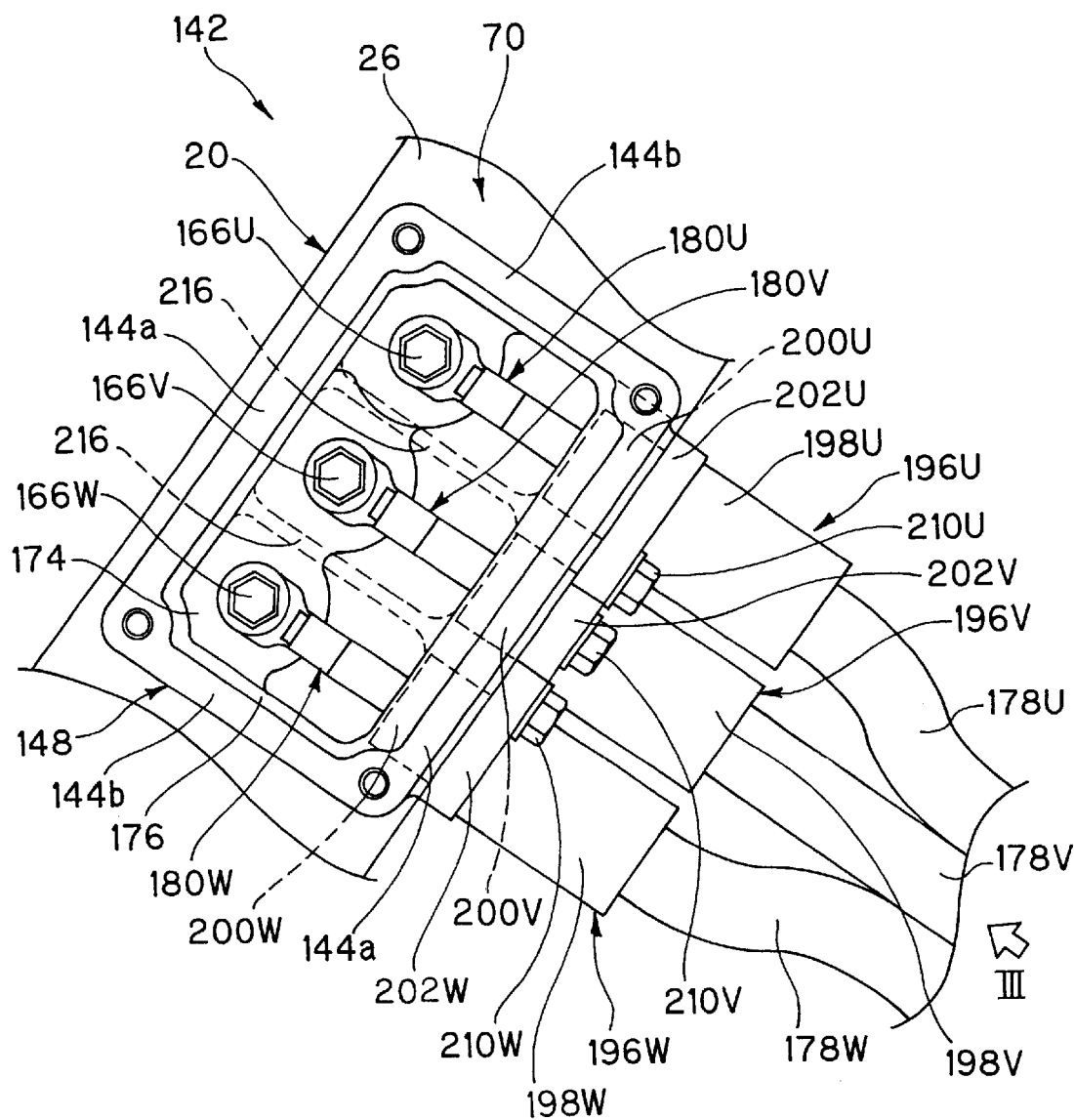
FIG. 2 is a plane view of a terminal box taken at arrow II in FIG. 1.

The vertical walls of the above substantially square-cylindrical shaped terminal box 148 comprise a pair of long vertical walls 144a, in parallel with the array direction of the motor-side connection terminals 154, and a pair of short vertical walls 144b, perpendicular to the array direction, as shown in FIG. 2. The above plurality of motor-side connection terminals 154U, 154V, 154W are, as shown in FIG. 1, adjacent to one of the long vertical walls 144a of the terminal box 148, and are directed in the outward radial direction of the motor case 20 in the motor-side through hole 150, and also arrayed in the circumferential direction, and are embedded and retained by molding 174.

Figure 3:
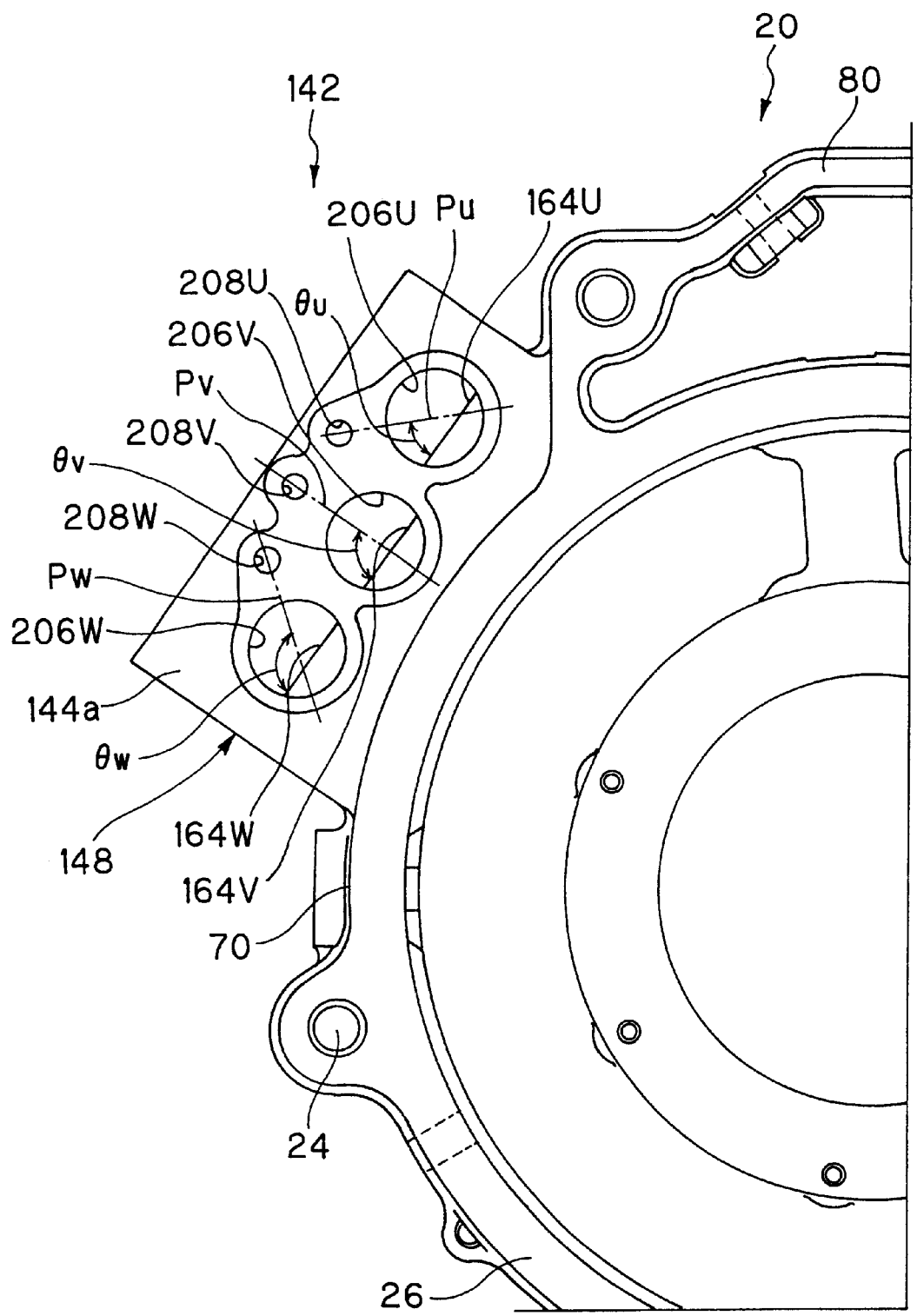
FIG. 3 is a front view of a terminal box taken at arrow III in FIG. 2.

As shown in FIG. 1 through FIG. 3, a plurality of connector mating holes 206U, 206V, 206W, and a plurality of connector fastening screw holes 208U, 208V, 208W which form pairs with the plurality of connector mating holes 206U, 206V, 206W, are formed in the long vertical wall 144a on the side removed from the motor-side connection terminals 154 of the pair of long vertical walls 144a in parallel with the array direction of the motor-side connection terminals 154, the holes being formed in a direction substantially perpendicular to each of the axes of the respective motor-side connection terminals 154U, 154V, 154W, and arrayed in the circumferential direction.

The connector-side mating portions 200U, 200V, 200W are mated with the connector mating holes 206U, 206V, 206W. The fastening bolts 210U, 210V, 210W, which are passed through the fastening through holes 204U, 204V, 204W of the connector-side fastening portions 202U, 202V, 202W, are screwed into the plurality of connector fastening screw holes 208U, 208V, 208W.

The angles θu, θv, θw made by the planes Pu, Pv, Pw containing each of the axes of the connector mating screws 206U, 206V, 206W and the paired connector fastening screw holes 208U, 208V, 208W formed in the opposite-side long vertical wall 144a with each of the motor-side connecting surfaces 164U, 164V, 164W formed at the tips of the motor-side connection portions 158U, 158V, 158W of the above plurality of motor-side connection terminals 154U, 154V, 154W, are each arranged differently so as to be concentrated at the center of the long vertical wall 144a, as shown in FIG. 3.

In this wiring connection device 142, the plurality of motor-side connection terminals 154U, 154V, 154W is directed in the outward radial direction within the motor-side through hole 150 of the terminal box 148, and arrayed in the circumferential direction, and embedded and retained by means of molding 174; and the plurality of cable-side connection terminals 180U, 180V, 180W is inserted, from the connector mating holes 206U, 206V, 206W of a long vertical wall 144a among the vertical walls 144 of the terminal box 148, directed in directions substantially perpendicular to the axial directions of the respective motor-side connection terminals 154W, 154V, 154W in the terminal box 148, and arrayed in the circumferential direction.

Next, in the wiring connection device 142, the connector-side mating portions 200U, 200V, 200W of the connectors 196W, 196V, 196W are mated with the respective plurality of connector mating holes 206U, 206V, 206W, and the fastening bolts 210U, 210V, 210W, which are passed through the fastening through holes 204U, 204V, 204W of the connector-side fastening portions 202U, 202V, 202W, are screwed into the plurality of connector fastening screw holes 208U, 208V, 208W, and the respective connectors 196U, 196V, 196W are fastened in the long vertical wall 144a.

Then, in the wiring connection device 142, the cable-side connection surfaces 192U, 192V, 192W of the cable-side connection terminals 180U, 180V, 180W are brought into contact with the motor-side connection surfaces 164U, 164V, 164W of the motor-side connection terminals 154U, 154V, 154W, and the connection bolts 166U, 166V, 166W, which are passed through the connection through holes 194U, 194V, 194W of the cable-side connection portions 188U, 188V, 188W, are screwed into the connection screw holes 168U, 168V, 168W of the motor-side connection portions 158U, 158V, 158W, connecting the cable-side connection terminals 180U, 180V, 180W to the motor-side connection terminals 154U, 154V, 154W; and a lid member 212, which blocks the aperture portion 146 at the tip of the vertical walls 144 of the terminal box 148, is mounted by means of a mounting bolt 214, via a liquid-form gasket, O-ring, gasket sheet, or other sealing member (not shown).

Next, the operation is explained.

In the vehicle motor-assist device 4 linked to the engine 2 a substantially cylindrical motor case 20, mounted on the cylinder block 8 of the engine 2, is provided; in this motor case 20 the motor stator 60 of an electric motor 54 having an electricity generation function, is mounted, a rotor mounting member 22 is mounted on the crankshaft 18 of the engine 2, and on this rotor mounting member 22 the motor rotor 58 of the electric motor 54 is mounted.

The wiring connection device 142, which connects the motor-side coil wire 152 of the motor rotor 58 with the power supply cable 178, is provided with a terminal box 148, having substantially the shape of a square cylinder with vertical walls 144 standing integrally, and having an aperture portion 146 directed in the outward radial direction. In the case periphery wall 26 surrounded by the vertical walls 144 a motor-side through hole 150 penetrating into the motor case 20 is formed, and directed in the outward radial direction. A motor-side connection terminal 154 is crimped onto and mounted on a motor-side coil wire 152 drawn from the motor stator 60; this motor-side connection terminal 154 is embedded into and retained in the motor-side through hole 150 by means of molding 174, and in addition the motor-side through hole 150 is sealed by this molding 174.

In this way, in this wiring connection device 142 a terminal box 148 is formed in the outer periphery face 70 of the case periphery wall 26 of a motor case 20, having substantially the shape of a square cylinder with vertical walls 144 standing integrally. By embedding and retaining the motor-side connection terminal 154 of the motor-side coil wire 152 in the motor-side through hole 150 of the case periphery wall 26 in the terminal box 144 using molding 174, a separate terminal block or terminal case is not necessary as in the prior art;-and because proximity to the motor-side connection terminal 174 from the outside of the motor case 20 is made possible by means of the aperture portion 146 of the terminal box 148 directed outward in the radial direction, connection operations within the motor case 22 are not necessary. By means of the molding 174 which embeds and retains the motor-side connection terminal 154, the motor-side through hole 150 is sealed, and so the interior of the terminal box 148 and the interior of the motor case 20 can be isolated to a watertight degree.

Because this wiring connection device can eliminate the separate terminal block or terminal case of the prior art, the construction can be simplified and costs can be reduced, and connection operations within the motor case 20 can be rendered unnecessary. Hence connection operations can be made easy, and ease of operation improved; and by enabling watertight isolation of the interior of the terminal box 148 and the interior of the motor case 20, the water resistance within the terminal case 148 can be improved, and reliability can be enhanced. And, by employing the same operation to seal the interiors of the motor stator 60 and terminal box 148 with molding 174, ease of operation, and the reliability of water resistance, can be improved.

By crimping and mounting the motor-side coil wire 152 to the above motor-side connection terminal 154 prior to installation in the motor case 20 of the motor stator 60 of the electric motor 54, the installation of the motor stator 60 is not obstructed, and ease of operation can be improved. And, even if the above motor-side coil wire 152 is crimped by the motor-side connection terminal 154 embedded in molding 174, because of the excellent pliability of the coil wire 152, no problems with large bending resistance arise on installation of the motor stator 60 in the motor case 20, and ease of operation can be improved.

In this wiring connection device 142, the inner surfaces of the vertical walls 144 of the terminal box 148 are covered with molding 176, and the coil wire retaining portion 156 of the motor-side connection terminals 154 and motor-side coil wires 152 are covered with insulating tubes 172, so that the insulating resistance between the ground-side terminal box and the high-voltage-side motor-side connection terminals 154, connection bolt 166, cable-side connection terminals 180, and cores 182 can be improved, and the insulation can be made dependable, while in addition the vertical walls 144 can be placed adjacent to the motor-side connection terminals 154, connection bolt 166, cable-side connection terminals 180 and cores 182, and the terminal box 148 can be made smaller.

As shown in FIG. 2 and FIG. 6, in the terminal box 148 are formed rib-shaped insulating portions 216 integrally with the molding 174, between the plurality of motor-side connection terminals 154U, 154V, 154W on the high-voltage side and the plurality of cable-side connection terminals 180U, 180V, 180W connected to these motor-side connection terminals 154U, 154V, 154W. By this means, the spatial distance and creepage distance between each of the phases U, V, W can be increased, insulation can be made still more reliable, and the vertical walls 144 can be placed still closer to the motor-side connection terminals 154 and cable-side connection terminals 180 and similar, so that the terminal box 148 can be made still smaller. And by forming the insulating portions 216 integrally with the molding 174, there is no need to provide separate portions, and fabrication is facilitated.

In the wiring connection device 142, the motor-side connection terminals 154 comprise a base-side coil wire retaining portion 156 and a tip-side motor-side connection portion 158; in the coil wire retaining portion 156 a motor wire insertion hole 160 is formed, directed in the axial direction, into which the motor-side coil wire 152 is inserted; in one side in the radial direction, adjacent to the motor-side connection portion 158 a plating liquid hole 162 for pouring plating liquid into the coil wire insertion hole 160 is formed. In the motor-side connection portion 158 a connection screw hole 168 is formed, directed in the axial direction, into which the connection bolt 166 is screwed, and on the outer periphery a whirl-stop portion 170 is formed, embedded in the molding 174.

By this means, in the wiring connection device 142 the motor-side connection terminals 154 can be reliably fixed in the molding 174 by means of the whirl-stop portion 170, the tightening torque of the connection bolts 166 screwed into the connection screw holes 168 can be maintained by means of the whirl-stop portions 170 embedded in the molding 174, and the connection of the cable-side connection terminal 180 to the motor-side connection terminal 154 becomes more secure.

Further, the motor-side connection terminals 154 are provided with a plating liquid hole 162 formed in one side in the radial direction adjacent to the motor-side connection portion 158, for pouring plating liquid into the coil wire insertion hole 160, so that plating of the interior of the coil wire insertion hole 160 can be performed reliably, and the electrical connection with the motor-side coil wire 152 can be made satisfactory. After execution of plating, the motor-side coil wire 152 is inserted into the coil wire insertion hole 160 of the coil wire retaining portion 156, and the coil wire retaining portion 156 is crimped with an appropriate tool from the other side in the radial direction opposing the plating liquid hole 162, in consideration of the large deformation of the coil wire retaining portion 156 due to crimping; by crimping the coil wire retaining portion 156 to clamp and mount the motor-side coil wire 152, concentration of stress at the plating liquid hole 162 due to deformation can be avoided, and cracking can be prevented.

In this wiring connection device 142, there are provided a plurality of motor-side connection terminals 154U, 154V, 154W, and a plurality of cable-side connection terminals 180U, 180V, 180W; connectors 196U, 196V, 196W are respectively mounted on the cable-side connection terminals 180U, 180V, 180W. A plurality of connector mating holes 206U, 206V, 206W, and a plurality of connector fastening screw holes 208U, 208V, 208W which form pairs with the plurality of connector mating holes 206U, 206V, 206W, are formed in the long vertical wall 144a on the side removed from the motor-side connection terminals 154 of the terminal box 148; the angles θu, θv, θw made by the planes Pu, Pv, Pw containing each of the axes of the connector mating holes 206U, 206V, 206W and the paired connector fastening screw holes 208U, 208V, 208W, formed in the other long vertical wall 144a, with each of the motor-side connection surfaces 164U, 164V, 164W formed in the plurality of motor-side connection terminals 154U, 154V, 154W, are each arranged differently so as to be concentrated at the center of the long vertical wall 144a.

By this means, in the wiring connection device 142 the relative angles made by the motor-side connection surfaces 164U, 164V, 164W and the connector fastening screw holes 208U, 208V, 208W differ, so that incorrect attachment of the plurality of cable-side connection terminals 180U, 180V, 180W can be prevented, and the connector fastening screw holes 208U, 208V, 208W can be concentrated at the center of the long vertical wall 144a, so that the terminal box 148 can be made smaller.

In this wiring connection device 142, a plurality of motor-side connection terminals 154U, 154V, 154W is directed in an outward radial direction within the motor-side through hole 150 of the terminal box 148, arrayed in the circumferential direction, and embedded and retained by means of molding 174; a plurality of cable-side connection terminals 180U, 180V, 180W is inserted into the terminal box 148 from the connector mating holes 206U, 206V, 206W of a long vertical wall 144a of the terminal box 148, and each of the plurality of connectors 196U, 196V, 196W is fastened to the long vertical wall 144a by fastening bolts 210U, 210V, 210W. By screwing the connection bolts 166U, 166V, 166W into the connection screw holes 168U, 168V, 168W directed in the outward radial direction of the motor-side connection portions 158U, 158V, 158W, the cable-side connection terminals 180U, 180V, 180W are connected to the motor-side connection terminals 154U, 154V, 154W, and a lid member 212, which blocks the aperture portion 146 at the tip of the vertical walls 144 of the terminal box 148, is mounted in watertight fashion by means of a mounting bolt 214, via a sealing member.

By this means, the wiring connection device 142 facilitates terminal connection operations in the terminal box 148, which involve attachment operations from substantially the radial direction of the motor case 20. Further, because the lid member 212 is mounted to a watertight degree on the aperture portion 146 of the terminal box 148, the intrusion of water into the terminal box 148 can be prevented, and the water resistance of the electric motor 54 can be improved, while in addition terminals can be disconnected simply by removing the lid member 212, without disassembly of the terminal box 148. Further, by packing the interior of the terminal box 148 with insulating liquid-form gaskets, the insulation properties can be improved while further enhancing water resistance.

In this embodiment, whirl-stop portions 170 in a diagonal-line knurled shape are provided on the outer periphery of the motor-side connection terminals 154, fixed to the molding 174; but as shown in FIG. 10, two-stage whirl-stop portions 218 with parallel-line knurls can also be provided on the outer periphery of the motor-side connection terminals 154; as shown in FIG. 11, whirl-stop portions 220 comprising two flat parallel planes can be provided at the outer periphery at the desired position in the radial direction on the motor-side connection terminals 154; and as shown in FIG. 12, two-stage whirl-stop portions 222 in a hexagonal shape can be provided on the outer periphery of the motor-side connection terminals 154.

Figure 13:
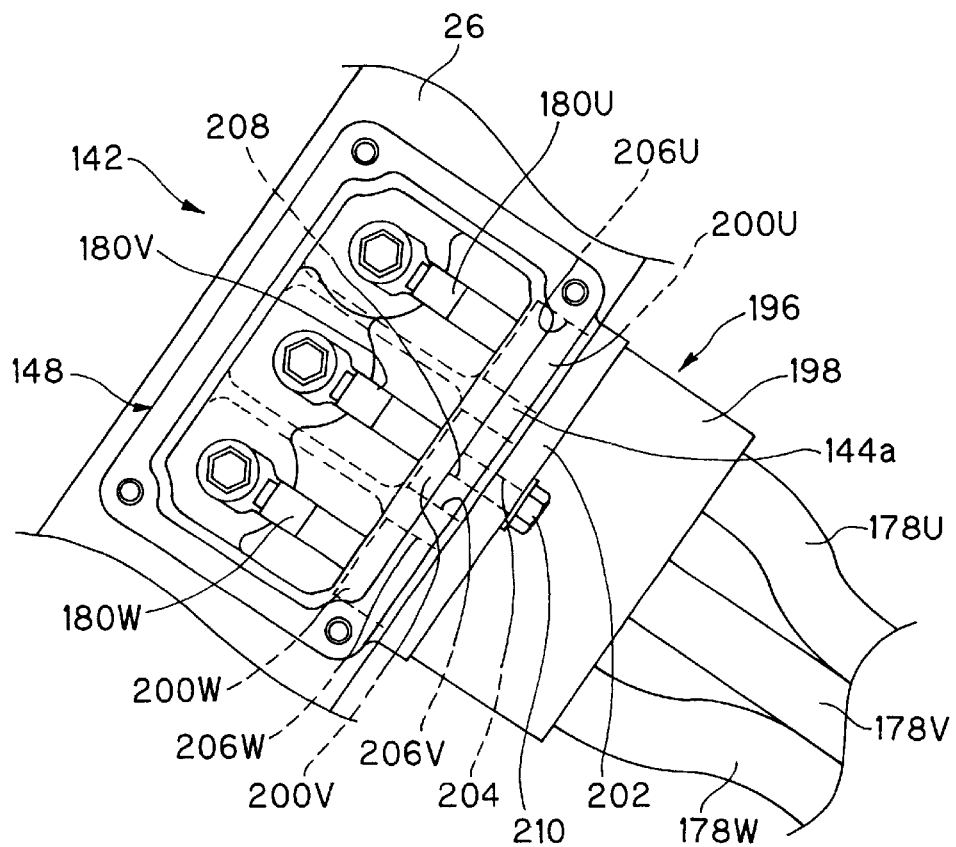
FIG. 13 is a plane view of a terminal box showing a different embodiment of the connector.

FIG. 13 shows another embodiment of a connector 196 which fastens each power supply cable 178U, 178V, 178W to the terminal box 148. In the connector 196 shown in FIG. 13, the connector body 198 in which are mounted each of the power supply cables 178U, 178V, 178W is formed integrally, the connector-side mating portions 200U, 200V, 200W which mate with the respective connector mating holes 206U, 206V, 206W are formed independently in the connector body 198, the connector-side fastening portion 202 fixed in a long vertical wall 144a is formed integrally, and one fastening through hole 204 is formed.

In the connector 196 shown in FIG. 13, the connector body 198 and connector-side fastening portion 202 are formed integrally, and a single fastening through hole 204 is formed, so that only a single connector fastening screw hole 208 is required in the terminal box 148, and a single fastening bolt 210 is needed, so that the number of machining processes can be reduced; further, by enabling the fastening to the terminal box 148 of the three power supply cables 178U, 178V, 178W in a single operation, the number of parts, number of machining processes, and number of assembly operations can be reduced, and erroneous attachment can be prevented.

Figure 14:
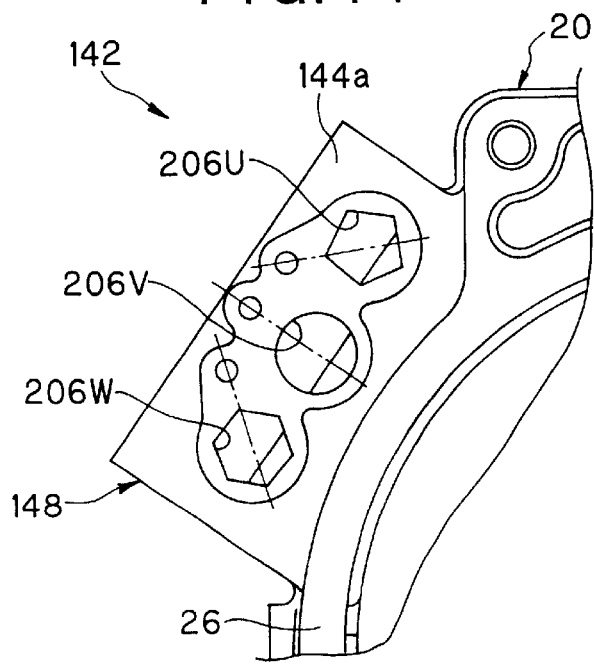
FIG. 14 is a front view showing another embodiment of the terminal box.

FIG. 14 shows another embodiment of the terminal box 148. In the terminal box 148 shown in FIG. 14, connector mating holes 206U, 206V, 206W are formed in a long vertical wall 144a with different shapes for the respective power supply cables 178U, 178V, 178W, and connector-side mating portions 200U, 200V, 200W, having cross-sectional shapes corresponding to the respective connector mating holes 206U, 206V, 206W, are formed in the connector 196.

In the terminal box 148 shown in FIG. 14, by forming in a long vertical wall 144a connector mating holes 206U, 206V, 206W with different shapes for each of the respective connectors 196U, 196V, 196W, if the connector-side mating portion 200U, 200V, 200W does not have the correct cross-sectional shape, mating is not possible, and so erroneous mating of the connector-side mating portions 200U, 200V, 200W can be reliably prevented.

Figure 15:
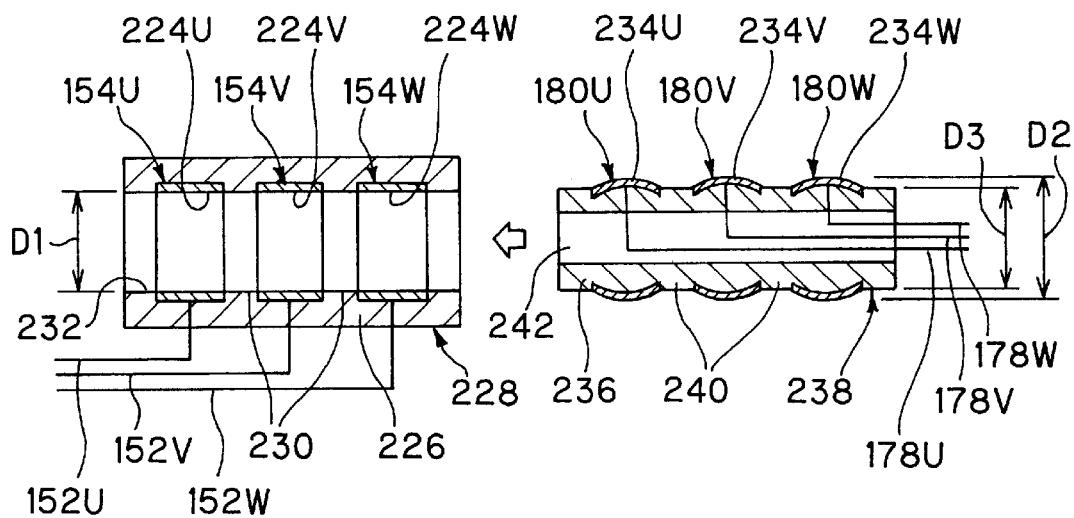
FIG. 15 is a cross-sectional view showing another embodiment of the motor-side connection terminal and cable-side connection terminal.

FIG. 15 shows another embodiment of the motor-side connection terminals 154 and cable-side connection terminals 180. The motor-side connection terminals 154U, 154V, 154W, electrically connected to a plurality of motor-side coil wires 152U, 152V, 152W, have cylindrical-shape motor-side connection portions 224U, 224V, 224W having inner diameter D1, arranged in a row with intervals between coaxial cores, embedded and retained in the inner periphery of the cylindrical-shape motor-side terminal retainer 228 by means of molding 226 having both insulating and elastic properties. A motor-side joining hole 232 of inner diameter D1 is formed on the inner periphery of the motor-side terminal retainer 228, and a ring-shaped insulating portion 230 is secured between each of the motor-side connection portions 224U, 224V, 224W.

The cable-side connection terminals 180U, 180V, 180W, electrically connected with a plurality of power supply cables 178U, 178V, 178[ii], have cable-side connection portions 234U, 234V, 234W, with a U-shaped cross-section and having an outer diameter D2 slightly larger than the above inner diameter D1, arranged in a row with intervals between coaxial cores, embedded and retained in the outer periphery of a cable-side retainer 238 having inner diameter D1 and substantially the same outer diameter D3 by means of molding 236 with insulating and elastic properties. A ring-shaped insulating portion 240 is secured between each of the cable-side connecting portions 234U, 234V, 234W on the outer periphery of the cable-side retainer 238, and a drawing-out hole 242 which draws out the above power supply cables 178U, 178V, 178W is formed.

[ii] This should probably be "178W".

The motor-side connection terminals 154 and cable-side connection terminals 180 shown in FIG. 15 are such that, when the cable-side retainer 238 in which are buried and embedded the cable-side connection terminals 180U, 180V, 180W is joined inside the motor-side joining hole 232 of the motor-side terminal retainer 228 in which are buried and embedded the motor-side connection terminals 154U, 154V, 154W, the cable-side connecting portions 234U, 234V, 234W with cylindrical shapes and U-shape cross-sections, having an outer diameter D2 slightly larger than the inner diameter D1, come into elastic contact with the cylindrical-shape motor-side connection portions 224U, 224V, 224W having inner diameter D1, and are electrically connected, as a result of which the plurality of motor-side connection terminals 154 and cable-side connection terminals 180 can each be reliably connected by a single connection operation, without requiring fastening bolts or similar; the number of attachment operations and parts can be reduced, and erroneous attachment can be prevented.

In this way, in the wiring connection device of this invention, a terminal box is formed in the outer periphery face of the case periphery wall of a motor case, having substantially the shape of a square cylinder with vertical walls standing integrally. By embedding and retaining the motor-side connection terminals of the motor-side coil wire in a motor-side through hole of the case periphery wall in the terminal box using molding, a separate terminal block or terminal case is not required; and because proximity to the motor-side connection terminals from the outside of the motor case is made possible by means of the aperture portion of the terminal box directed outward in the radial direction, connection operations within the motor case become unnecessary. By means of the molding which embeds and retains the motor-side connection terminals, the motor-side through hole is sealed, and so the interior of the terminal box and the interior of the motor case can be isolated to a watertight degree.

Consequently, by rendering unnecessary a separate terminal block or terminal case, the wiring connection device of this invention enables a simplified construction and reduced costs, and also makes unnecessary connection operations within the motor case; by this means connection operations are facilitated and ease of operation is improved. As a result of watertight isolation of the terminal box interior and motor case interior, the water resistance of the terminal case interior can be improved, and reliability can be enhanced.

What is claimed is:

1. A wiring connection device, wherein a substantially cylindrical-shape motor case is mounted on the cylinder block of an engine; the motor stator of an electric motor having an electricity generation function is mounted in this motor case; on the crankshaft of said engine is mounted a rotor mounting member; the motor rotor of said electric motor is mounted on this rotor mounting member; a terminal box, having substantially the shape of a square cylinder and with vertical walls standing integrally, and having an aperture portion directed in the outward radial direction is formed on the outer periphery of the case periphery wall of said motor case; a motor-side through hole, directed in the outward radial direction and which communicates inside and outside of said motor case is formed in the case periphery wall enclosed by said vertical walls; a motor-side connection terminal is mounted on motor-side coil wire drawn out from said motor stator; the motor-side connection terminal is embedded and held by molding within said motor-side through hole; and said motor-side through hole is sealed by means of this molding.

2. The wiring connection device according to claim 1, wherein the inner surfaces of the vertical walls of said terminal box are covered with molding.

3. The wiring connection device according to claim 1, wherein respective motor-side connection terminals are attached to a plurality of motor-side coil wires drawn out from said motor stator; this plurality of motor-side connection terminals is embedded and retained in the motor-side through hole by means of molding; respective cable-side connection terminals are attached to a plurality of power supply cables, each electrically connected to said plurality of motor-side coil wires; and, insulating portions are formed between said plurality of motor-side connection terminals and between said plurality of cable-side connection terminals, respectively connected to this plurality of motor-side connection terminals.

4. The wiring connection device according to claim 1, wherein said motor-side connection terminal is constituted by a base-side coil wire retaining portion and a tip-side motor-side connecting portion; a motor wire insertion hole, into which the motor-side coil wire is inserted and crimped, is formed in said coil wire retaining portion, directed in the axial direction; a connection screw hole in which is screwed the connection bolt of said motor-side connecting portion is formed, directed in the axial direction; and, a whirl-stop portion, embedded in molding, is formed in said motor-side connecting portion.

5. The wiring connection device according to claim 4, wherein a plating liquid hole is formed in one side in the radial direction of the coil wire retaining portion of said motor-side connection terminal, enabling the inflow of plating liquid into the coil wire insertion hole; and, after plating, the motor-side coil wire is inserted into the coil wire insertion hole, said coil wire retaining portion is crimped from the side in the radial direction opposing the plating liquid hole, so that the motor-side coil wire is attached in the coil wire retaining portion while being pressed against thereto.

6. The wiring connection device according to claim 1, wherein said cable-side connection terminal is constituted by a base-side cable retaining portion and tip-side cable-side connecting portion; a motor wire insertion hole, in which the core of a power supply cable is inserted and crimped, is formed in said cable retaining portion, directed in the axial direction; and, a connection through hole, through which is passed said connection bolt, is formed in said cable-side connecting portion, directed in a direction intersecting the axis.

7. A wiring connection device, wherein a substantially cylindrical-shape motor case is mounted on a cylinder block of an engine; a motor stator of an electric motor having an electricity generation function is mounted in the motor case; on the crankshaft of the engine is mounted a rotor mounting member; the motor rotor of the electric motor is mounted on the rotor mounting member; a terminal box, having vertical walls standing integrally and extending outwardly from an outer periphery of said motor case, the vertical walls having an aperture portion directed in an outward radial direction defined by the vertical walls; a motor-side through hole, directed in the outward radial direction and which communicates inside and outside of said motor case is formed in a case periphery wall of said motor case and is enclosed by said vertical walls; a plurality of motor-side connection terminals mounted on respective ones of a plurality of motor-side coil wires drawn out from said motor stator, the motor-side connection terminals being embedded and retained within said motor-side through hole and directed in the outward radial direction and arrayed in the circumferential direction by molding, the molding sealing said motor-side through hole; respective cable-side connection terminals attached to a plurality of power supply cables, and respective connectors attached for fastening to said terminal box; a plurality of connector mating holes, and a plurality of connector fastening screw holes paired with the plurality of connector mating holes, are formed in a vertical wall of said terminal box parallel to the arrayed direction of said motor-side connection terminals, directed in directions substantially perpendicular to the axial directions of said respective motor-side connection terminals, and arrayed in the circumferential direction; and, said plurality of connector mating holes and connector fastening screw holes are arranged such that angles made by planes containing each of the axes of the connector fastening screw holes and paired connector mating holes formed in said vertical wall, with each of motor-side connection surfaces formed at tips of motor-side connecting portions of said motor-side connection terminals respectively connected to said plurality of cable-side connection terminals, are each different.

8. A wiring connection device, wherein a substantially cylindrical-shape motor case is mounted on a cylinder block of an engine; a motor stator of an electric motor having an electricity generation function is mounted in the motor case; on the crankshaft of the engine is mounted a rotor mounting member; the motor rotor of the electric motor is mounted on the rotor mounting member; a terminal box, having vertical walls stands integrally and extends from an outer periphery of said motor case, the vertical walls having an aperture portion directed in an outward radial direction defined by the vertical walls; a motor-side through hole, directed in the outward radial direction and which communicates inside and outside of said motor case is formed in a case periphery wall of said motor case and enclosed by said vertical walls; a plurality of motor-side connection terminals mounted on respective ones of a plurality of motor-side coil wires drawn out from said motor stator, the motor-side connection terminals being embedded and retained within said motor-side through hole and directed in the outward radial direction and arrayed in the circumferential direction by molding, the molding sealing said motor-side through hole; a plurality of cable-side connection terminals are directed through a plurality of connector mating holes in a vertical wall of said terminal box to within said terminal box, in directions substantially perpendicular to the axial directions of said respective motor-side connection terminals, and arrayed in the circumferential direction; respective connectors of said cable-side connection terminals are mated with said plurality of connector mating holes and respective fastening bolts are screwed into a plurality of connector fastening screw holes, fastening each said connector to said vertical wall; cable-side connecting surfaces of cable-side connecting portions of said cable-side connection terminals are brought into contact with motor-side connecting surfaces of motor-side connecting portions of said motor-side connection terminals; connection bolts passed through connection through holes of said cable-side connecting portions are screwed into connection screw holes of said motor-side connecting portions, so that said cable-side connection terminals are connected to said motor-side connection terminals; and, a lid member which blocks the aperture portion about an outer edge of said vertical walls of said terminal box is mounted in watertight fashion.

9. The wiring connection device according to claim 4, wherein said knurl-stop portion includes two flat parallel surfaces.

10. The wiring connection device according to claim 4, wherein said knurl-stop portion has a hexagonal shape.

11. The wiring connection device according to claim 1, wherein said motor-side connection terminal comprises a coil wire retaining portion and a motor-side connection portion, said motor-side connecting portion including two knurl-stop portions having parallel lines.

12. The wiring connection device according to claim 1, including connector mating holes in one of said vertical walls, wherein each said mating hole has a different shape.

13. The wiring connection device according to claim 1, wherein said motor-side connection terminal comprises one of a plurality of motor-side connection terminals, said motor side connection terminals including cylindrical-shaped motor-side connection portions having a first inner diameter, said wiring connection device including a single terminal retainer having insulating properties and a joining hole and ring-shaped insulating portions with an inner diameter equal to the first inner diameter, said terminal retainer retaining said cylindrical-shaped motor-side connection portions aligned therein between the ring-shaped insulating portions so that the joining hole includes motor-side connection portions spaced along the length thereof.

14. A combination in a hybrid vehicle of:

an engine having a cylinder block and a crankshaft;

a rotor mounting member mounted to the crankshaft;

an electric motor including a rotor mounted to the rotor mounting member and a stator, the stator including plural motor-side coil wires;

a motor casing secured to the cylinder block and containing the electric motor and a motor-side through hole;

a terminal box comprising walls projecting outwardly from a portion of an outer periphery surface of said motor casing, the motor-side through hole opening from an interior of said motor casing into said terminal box, said walls forming an aperture portion extending outwardly from the motor-side through hole, said terminal box having a lower end adjacent the motor-side through hole and an upper end at opposing outward edges of the walls;

motor-side connection terminals receiving respective ones of the motor-side coil wires;

molding material receiving said motor-side connection terminals and extending about part of the aperture portion and contacting inner surfaces of the walls of said terminal box, said motor-side connection terminals being embedded in said molding material and said molding material sealing the aperture portion of said terminal box from the motor casing interior, and a lid covering the upper end of said terminal box.

15. The combination of claim 14, wherein said terminal box includes a plurality of connector mating apertures in one of the walls thereof, a plurality of power supply cables ending at cable side connection terminals and having connector side mating portions, each said connector side mating portion mating with one of said mating apertures in the wall of said terminal box, and wherein said cable side connection terminals are secured to respective ones of said motor-side connection terminals inside said terminal box.

16. The combination of claim 15, wherein said motor side connection terminals include closed bore connection holes and said cable side connection terminals include cable side connecting portions with open connection apertures, said open connection apertures being in alignment with said connection holes so that respective connection members extend through respective ones of said open connection apertures and are secured in respective ones of said closed bore connection holes to provide surface to surface contact between said motor-side connection terminals and respective ones of said cable side connection terminals.

17. The combination of claim 14, wherein said terminal box is monolithic with said motor casing.

18. The combination of claim 14, wherein said motor side connection terminals include cylindrical-shaped motor-side connection portions each having a first inner diameter, a motor-side terminal retainer having insulating properties and a joining hole and ring-shaped insulating portions with an inner diameter substantially equal to the first inner diameter, said terminal retainer retaining said plurality of motor-side connection terminals therein positioned between the ring-shaped insulating portions and aligned so that the joining hole includes motor-side connection portions spaced along the length thereof, the molding material retaining said terminal retainer in said terminal box.

19. The combination of claim 18, including a plurality of cable side connection terminals having cable-side connection portions and electrically connected with a plurality of power supply cables, said cable-side connection portions having a U-shaped cross-section with an outer diameter slightly larger than the inner diameter of said cylindrical-shaped motor-side connection portions, and a cable side retainer receiving cores of said cable-side connection portions, and insulating portions of said cable side retainer spaced between said cable-side connection portions so that said cable side retainer is capable of being inserted in said motor-side terminal retainer in said terminal box with respective ones of said cable-side connection portions in electrical contact with respective ones of said motor-side connection portions.

* * * * *